(12) United States Patent
Park et al.

(10) Patent No.: US 6,356,501 B2
(45) Date of Patent: Mar. 12, 2002

(54) APPARATUS FOR GENERATING HIGH VOLTAGE SIGNAL

(75) Inventors: Hong-June Park; Young-Hee Kim; Young-Sung Han; Kie-Bong Ku; Byung-Joo Kang; Kyung-Won Kim; Jong-Tai Park, all of Ichon-shi (KR)

(73) Assignee: Hyundai Electronics Industries Co., Ltd., Ichon-shi (KR)

( * ) Notice: Subject to any disclaimer, the term of this patent is extended or adjusted under 35 U.S.C. 154(b) by 0 days.

(21) Appl. No.: 09/726,413

(22) Filed: Dec. 1, 2000

(30) Foreign Application Priority Data

Dec. 2, 1999 (KR) .............................. 99-54393

(51) Int. Cl.[7] ................................ G05F 1/10
(52) U.S. Cl. .................. 365/226; 365/189.09; 327/537
(58) Field of Search .................... 363/60; 327/536, 327/537; 331/74; 365/226, 189.09, 189.11

(56) References Cited

U.S. PATENT DOCUMENTS 5,126,590 A * 6/1992 Chern ........................ 327/536
6,278,315 B1 * 8/2001 Kim ............................ 327/536

* cited by examiner

Primary Examiner—Shawn Riley
(74) Attorney, Agent, or Firm—Finnegan, Henderson, Farabow, Garrett & Dunner, L.L.P.

(57) ABSTRACT

A high voltage generator provides a high voltage signal for compensating a threshold voltage loss in a semiconductor memory device. The high voltage generator includes: a level detection unit for detecting a voltage level of the high voltage signal to generate a high voltage enable signal when the voltage level of the high voltage signal reaches a predetermined target value; an oscillation unit, in response to the high voltage enable signal, for generating a plurality of clocks, the clocks including a first to a fourth clocks; a high-voltage charge pump unit, in response to the clocks, for increasing a voltage level of an external power signal to generate the high voltage signal to a high voltage node; and a power-on precharging unit, in response to a control signal, for initializing the high voltage node to a predetermined level.

19 Claims, 6 Drawing Sheets

| CLK42/CLK43 | 0 | VDD |
|---|---|---|
| CLK41/CLK44 | VDD | 0 |
| N41 | 2VDD | VDD |
| N42 | VDD | 2VDD |
| N43 | VDD | VPP |
| N44 | VPP | VDD |
| N45 | 0 | 2VDD |
| N46 | 2VDD | 0 |

APPARATUS FOR GENERATING HIGH VOLTAGE SIGNAL

FIELD OF THE INVENTION

The present invention relates to a semiconductor memory device; and, more particularly, to a high voltage generator for providing a high voltage signal for compensating a threshold voltage loss in a semiconductor memory device.

DESCRIPTION OF THE PRIOR ART

In a typical semiconductor memory device, a high voltage generator is used for compensating a voltage loss caused due to threshold voltages of metal oxide semiconductor (MOS) transistors. The high voltage generator supplies a high voltage signal that has a voltage level higher than an external power signal.

Since the high voltage signal can compensates for the threshold voltage loss, the high voltage generator are widely used in a word line drive circuit, a bit line isolation circuit, a data output buffer circuit, and the like.

Figure 1:
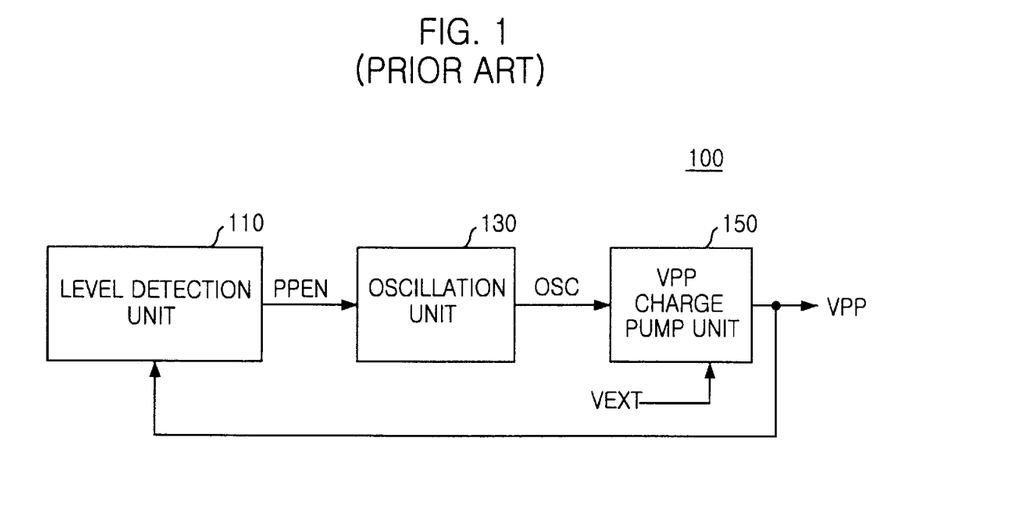
FIG. 1 is a block diagram showing a conventional high voltage generator.
Figure 2:
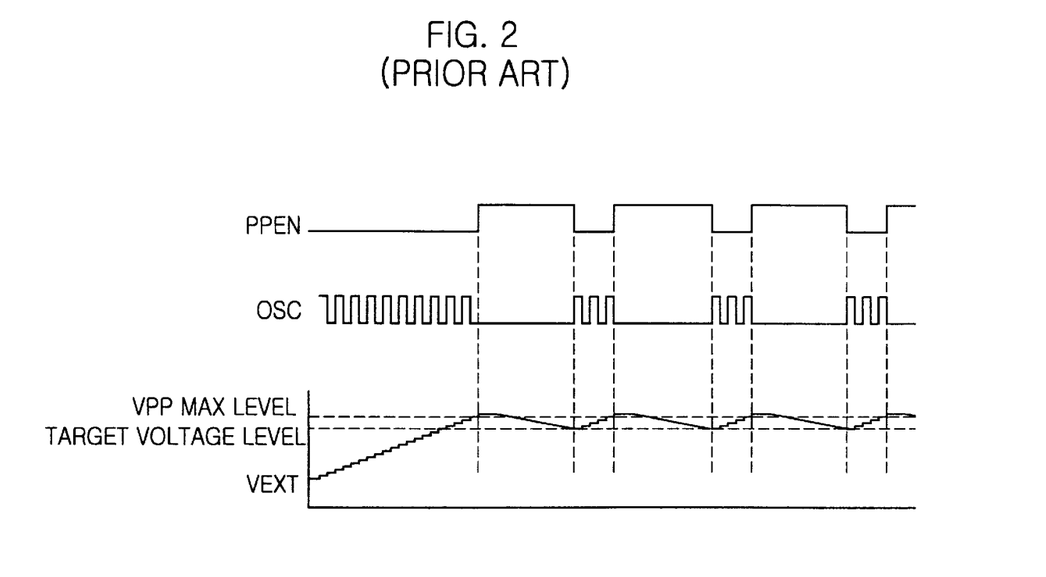
FIG. 2 shows a timing chart of the conventional high generator shown in FIG. 1.

FIG. 1 is a block diagram showing a conventional high voltage generator, and FIG. 2 shows a timing chart of the conventional high generator shown in FIG. 1.

Referring to FIGS. 1 and 2, a conventional high voltage generator 100 includes a level detection unit 110, an oscillation unit 130 and a high-voltage charge pump unit 150.

The level detection unit 110 detects a voltage level of a high voltage signal VPP to generate a high voltage enable signal PPEN when the voltage level of the high voltage signal VPP reaches a predetermined target value.

The oscillation unit 130 periodically generates an oscillation signal OSC in response to the high voltage enable signal PPEN.

The high-voltage charge pump unit 150 performs a pumping operation in response to the oscillation signal OSC to increase a voltage level of the external power signal VEXT, to thereby generate the high voltage signal VPP. Here, the high voltage signal VPP is fed back to the level detection unit 110.

At this time, the high-voltage charge pump unit 150 is generally implemented with a plurality of cross-coupled NMOS transistors and a transfer transistor for transferring a voltage level of (VPP+VDD), where VDD is a power potential applied to the pulse generator 100. However, a maximum gate potential of the transfer transistor reaches 3 VDD, which corresponds to about (VPP+VDD), so that a reliability related to gate oxide layers and a junction breakdown is deteriorated.

SUMMARY OF THE INVENTION

It is, therefore, an object of the present invention to provide a high voltage generator including a high-voltage charge pump unit, in which reliability related to the gate oxide layers and the junction breakdown is improved by reducing the maximum gate potential of the high-voltage charge pump unit to twice the power potential (2 VDD).

In accordance with an aspect of the present invention, there is provided a high-voltage charge pump circuit for use in a semiconductor memory device, comprising: a precharge control means for precharging a first and a second nodes to a power potential in response to a first and a second clocks, respectively; a precharge means for precharging a third and a fourth nodes to the power potential in response to voltage levels of the first and second nodes, respectively; a first charge pumping means for bootstrapping the first and the second nodes to twice the power potential in response to the first and the second clocks, respectively; a second charge pumping means for bootstrapping the third and the fourth bootstrapping nodes to twice the power potential in response to a third and a fourth clocks; and a transfer means for transferring voltage level of the third and the fourth nodes to an exterior in response to voltage levels of the fourth and the third nodes, respectively.

In accordance with another aspect of the present invention, there is provided a high voltage generator for providing a high voltage signal for use in a semiconductor memory device, comprising: a level detection means for detecting a voltage level of the high voltage signal to generate a high voltage enable signal when the voltage level of the high voltage signal reaches a predetermined target value; an oscillation means, in response to the high voltage enable signal, for generating a plurality of clocks, the clocks including a first to a fourth clocks; a high-voltage charge pump means, in response to the clocks, for increasing a voltage level of an external power signal to generate the high voltage signal to a high voltage node; and a power-on precharging means, in response to a control signal, for initializing the high voltage node to a predetermined level.

BRIEF DESCRIPTION OF THE DRAWINGS

Other objects and aspects of the invention will become apparent from the following description of the embodiments with reference to the accompanying drawings, in which.

DETAILED DESCRIPTION OF THE PREFERRED EMBODIMENTS

Figure 3:
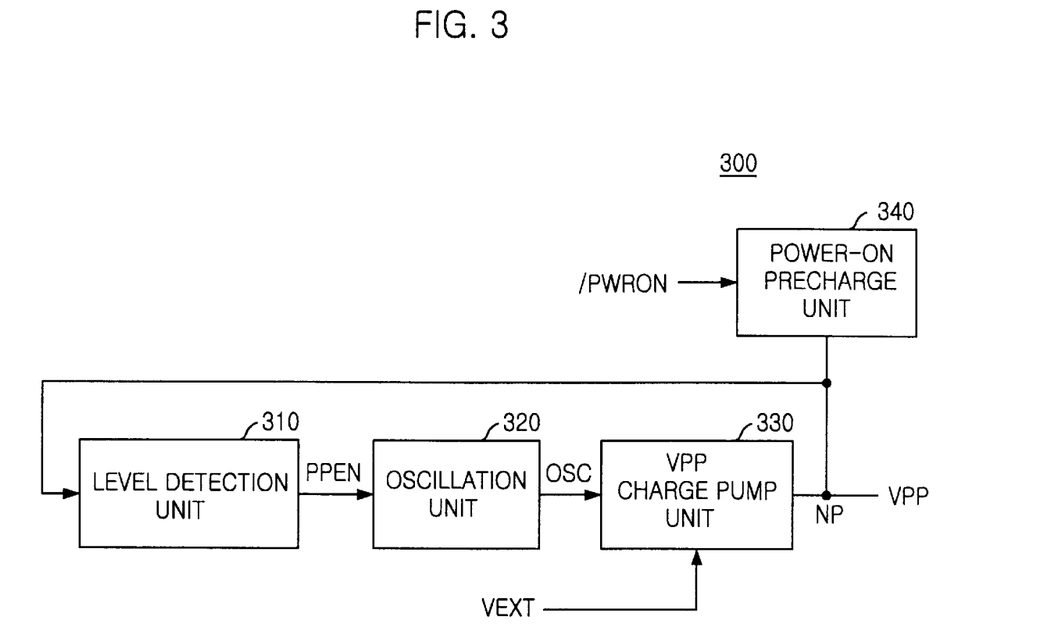
FIG. 3 is a block diagram illustrating a high voltage generator in accordance with an embodiment of the present invention.

FIG. 3 is a block diagram illustrating a high voltage generator in accordance with the present invention.

Referring to FIG. 3, the high voltage generator 300 in accordance with the present invention includes a level detection unit 310, an oscillation unit 320, a high-voltage charge pump unit 330 and a power-on precharge unit 340.

The level detection unit 310 detects a voltage level of a high voltage signal VPP to generate a high voltage enable signal PPEN when the voltage level of the high voltage signal VPP reaches a predetermined target value.

The oscillation unit 320 periodically generates an oscillation signal OSC in response to the high voltage enable signal PPEN. The oscillation signal OSC includes a first to a fourth clocks.

The high-voltage charge pump unit 330 performs a pumping operation in response to the oscillation signal OSC to increase a voltage level of the external power signal VEXT to thereby generate the high voltage signal VPP to a high voltage node NP. Here, the high voltage signal VPP is fed back to the level detection unit 310.

The power-on precharge unit 340 initializes the high voltage node NP to a predetermined voltage level in response to a power-on signal/PWRON, which is activated when a power applied to the high voltage generator 300 is on. That is, before the high-voltage charge pump unit 330 performs the pumping operation, the high voltage node NP is initialized to a voltage of (VEXT−VTH), where VTH is a threshold voltage of NMOS transistors contained in the high-voltage charge pump unit 330.

Figure 4:
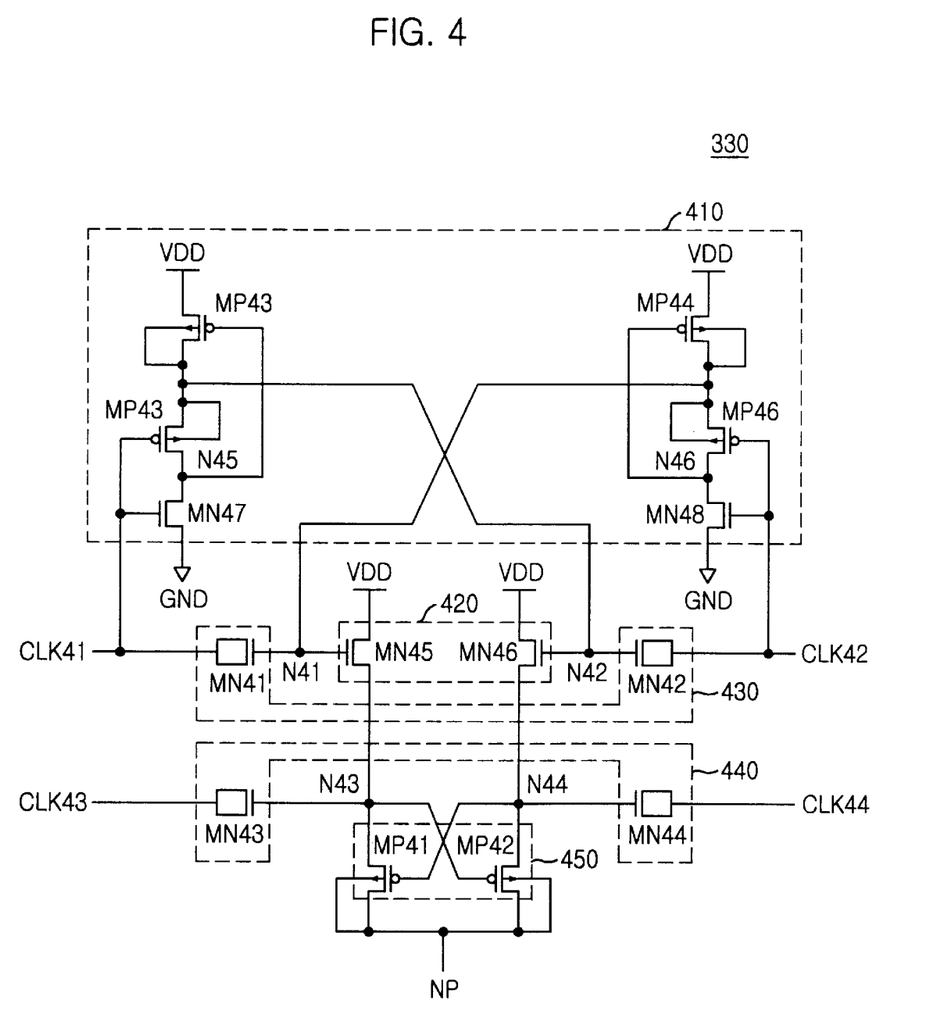
FIG. 4 is a circuit diagram illustrating a high-voltage charge pump unit shown in FIG. 3.

FIG. 4 is a circuit diagram illustrating the high-voltage charge pump unit 330 shown in FIG. 3.

Referring to FIG. 4, the high-voltage charge pump unit 330 includes a precharge control block 410, a precharge block 420, a first charge pump block 430, a second charge pump block 440 and a transfer block 450.

The precharge control block 410 precharges a first and a second bootstrapping nodes N41 and N42 to a power potential VDD when a first and a second clocks CLK41 and CLK42 are the power potential VDD.

The precharge block 420 precharges a third and a fourth bootstrapping nodes N43 and N44 to the power potential VDD in response to voltage levels of the first and the second bootstrapping nodes N41 and N42.

The first charge pump block 430 bootstraps the first and the second bootstrapping nodes N41 and N42 to a voltage level of 2 VDD in response to the first and the second clocks CLK41 and CLK42.

The second charge pump block 440 bootstraps the third and the fourth bootstrapping nodes N43 and N44 to a voltage level of 2 VDD in response to a third and a fourth clock CLK43 and CLK44.

The transfer block 450 transfers each voltage level of the third and the fourth bootstrapping nodes N43 and N44 to the high voltage node NP in response to each voltage level of the fourth and the third bootstrapping nodes N44 and N43, respectively.

The precharge control block 410 includes: a PMOS transistor MP43 having a source coupled to the power potential VDD and a gate coupled to a fifth bootstrapping node N45; a PMOS transistor MP45 having a source coupled to a drain of the PMOS transistor MP43, a drain coupled to the fifth bootstrapping node N45 and a gate receiving the first clock CLK41; an NMOS transistor MN47 having a drain coupled to the drain of the PMOS transistor MP45, a source coupled to a ground potential GND and a gate receiving the first clock CLK41; a PMOS transistor MP44 having a source coupled to the power potential VDD and a gate coupled to a sixth bootstrapping node N46; a PMOS transistor MP46 having a source coupled to a drain of the PMOS transistor MP44, a drain coupled to the sixth bootstrapping node N46 and a gate receiving the second clock CLK42; and an NMOS transistor MN48 having a drain coupled to the drain of the PMOS transistor MP46, a source coupled to the ground potential GND and a gate receiving the second clock CLK42.

In the precharge control block 410, when the first clock CLK41 is a low level, the PMOS transistor MP45 transfers a voltage level of the second bootstrapping node N42 to the fifth bootstrapping node N45. When the first clock CLK41 is a high level, the fifth bootstrapping node N45 is set to the ground potential through the NMOS transistor MN47. In similar manner, when the second clock CLK42 is a low level, the PMOS transistor MP46 transfers a voltage level of the first bootstrapping node N41 to the sixth bootstrapping node N46. When the second clock CLK42 is a high level, the sixth bootstrapping node N46 is set to the ground potential through the NMOS transistor MN48.

The precharge block 420 includes an NMOS transistor MN45, coupled between the power potential VDD and the third bootstrapping node N43, whose gate receives a voltage level of the first bootstrapping node N41, and an NMOS transistor MN46, coupled between the power potential VDD and the fourth bootstrapping node N44, whose gate receives a voltage level of the second bootstrapping node N42.

The first charge pump block 430 includes an NMOS transistor MN41 having a drain and a source receiving the first clock CLK41 and a gate coupled to the first bootstrapping node N41, and an NMOS transistor MN42 having a drain and a source receiving the second clock CLK42 and a gate coupled to the second bootstrapping node N42.

The second charge pump block 440 includes an NMOS transistor MN43 having a drain and a source receiving the third clock CLK43 and a gate coupled to the third bootstrapping node N43, and an NMOS transistor MN44 having a drain and a source receiving the fourth clock CLK44 and a gate coupled to the fourth bootstrapping node N44.

The transfer block 450 includes a PMOS transistor MP41, coupled between the third bootstrapping node N43 and the high voltage node NP, whose gate receives a voltage level of the fourth bootstrapping node N44, and a PMOS transistor MP42, coupled between the fourth bootstrapping node N44 and the high voltage node NP, whose gate receives a voltage level of the third bootstrapping node N43.

At this time, the second clock CLK42 and the third clock CLK43 has the same phase except for non-overlapping times, and the first clock CLK41 and the fourth clock CLK44 has the same phase.

Figure 5:
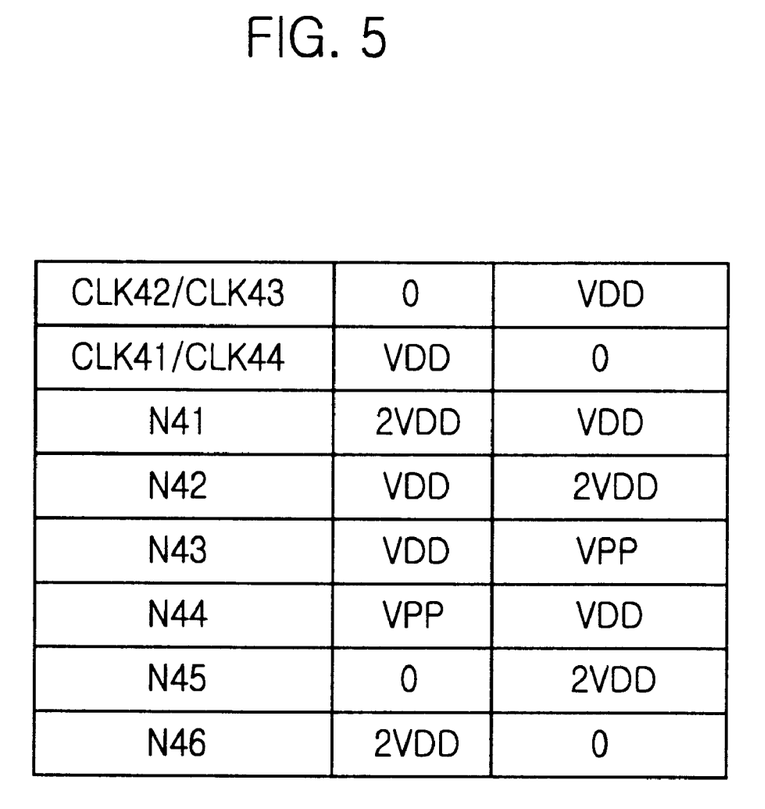
FIG. 5 is a table illustrating each voltage level of bootstrapping nodes in the high-voltage charge pump unit shown in FIG. 4 according to clocks.
Figure 6:
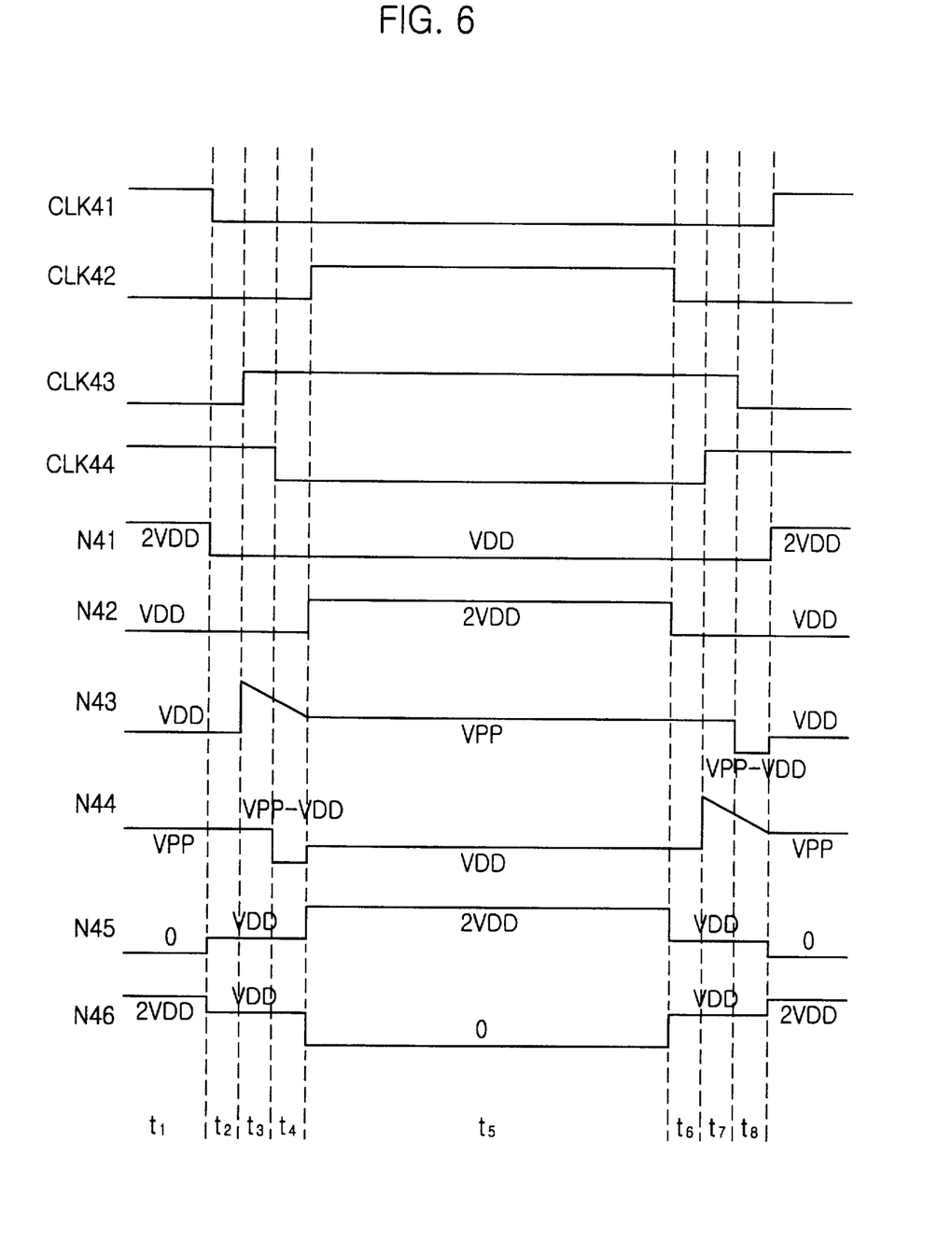
FIG. 6 is a timing chart of each bootstrapping node in FIG. 4.

FIG. 5 is a table illustrating each voltage level of the bootstrapping nodes N41 to N46 in the high-voltage charge pump unit 330, shown in FIG. 4, according to the clocks CLK41 to CLK44, and FIG. 6 is a timing chart of each bootstrapping node in FIG. 4.

Referring to FIGS. 5 and 6, steady-state voltages of the first and second bootstrapping nodes N41 and N42 swing in a range of VDD to 2 VDD by the precharge control block 410. Therefore, while the maximum gate potential of NMOS transistor in the prior art is (VPP+2 VDD), the maximum gate potential of the NMOS transistors MN45 and MN46 according to the present invention is 2 VDD with respect to P-substrate.

During a time period denoted by $t_1$ in FIG. 6, positive pumping charges of the fourth bootstrapping node N44 are transferred to the high voltage node NP through the PMOS transistor MP42.

Also, during a time period denoted by $t_5$ in FIG. 6, the voltage levels of the first to the fourth clocks CLK41, CLK42, CLK43 and CLK44 are VDD, 0V, 0V and VDD, respectively. Since the voltage levels of the first and the second bootstrapping nodes N41 and N42 are VDD and 2 VDD, respectively, the fourth bootstrapping node N44 is precharged to VDD through the NMOS transistor MN46, and the NMOS transistor MN45 is turned off.

As a result, the voltage levels of the third and the fourth bootstrapping nodes N43 and N44 become VPP and VDD respectively, and positive pumping charges of the third bootstrapping node N43 are fully transferred to the high voltage node NP through the PMOS transistor MP41.

Therefore, the charge pumping occurs twice in one cycle time as shown in FIG. 6. This is called two-phase charge pumping.

For obtaining a proper operation of the high-voltage charge pump unit 330, the NMOS transistor MN45 must be turned on when a potential applied to the gate of the NMOS transistor MN45 is 2 VDD. Since a potential applied to the source of the NMOS transistor MN45 is VDD, a potential between the gate and the source must be greater than the threshold voltage of the NMOS transistor MN45.

Figure 7:
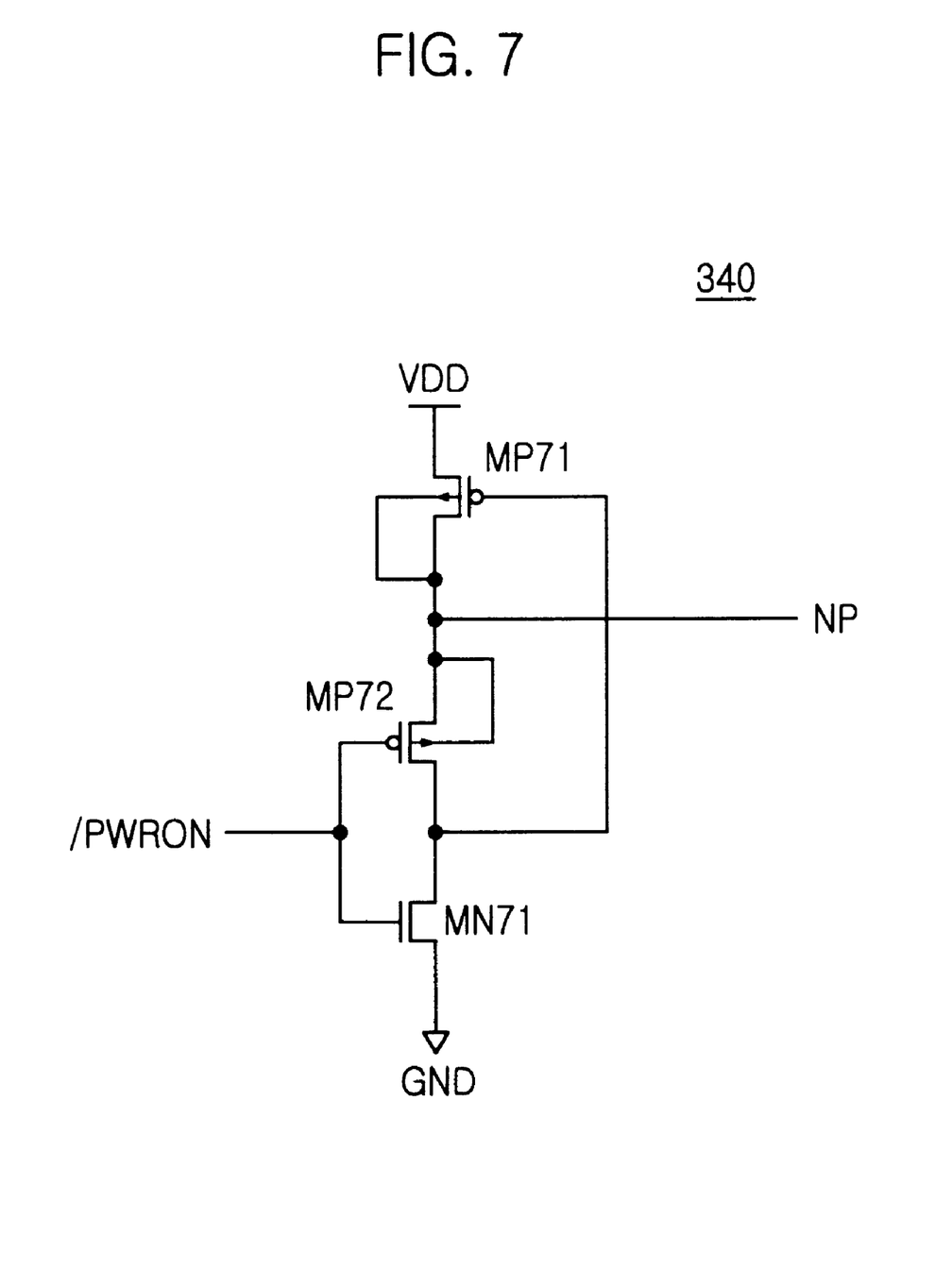
FIG. 7 is a circuit diagram illustrating a power-on precharge unit shown in FIG. 3.

FIG. 7 is a circuit diagram illustrating the power-on precharge unit 340 shown in FIG. 3.

Referring to FIG. 7, the power-on precharge unit 340 includes: a PMOS transistor MP71 coupled between the power potential and the high voltage node Np; a PMOS transistor MP72 having a source coupled to a drain of the PMOS transistor MP71 and a gate receiving the power-on signal/PWRON; and an NMOS transistor MN71 having a drain coupled to a drain of the PMOS transistor MP72, a source coupled to the ground potential GND and a gate receiving the power-on signal/PWRON. Furthermore, a gate of the PMOS transistor MP71 is coupled to the drain of the NMOS transistor MN71.

During a power-on period, i.e., when the power-on signal/PWRON remains at the power potential VDD, the PMOS transistor MP72 is turned off, and the NMOS transistor MN71 and the PMOS transistor MP71 are turned on. As a result, the power-on precharge unit 340 precharges the high voltage node NP to the power potential VDD.

Then, when the power-on signal/PWRON is changed to 0V, the NMOS transistor MN71 is turned off. Also, the PMOS transistor MP72 is turned on and the PMOS transistor MP71 is turned off. As a result, the high voltage node NP is increased toward the target value by the high-voltage charge pump unit 330.

As described above, by reducing the maximum gate potential of the high-voltage charge pump unit to 2 VDD, the reliability related to the gate oxide and the breakdown of the junction diodes is improved. Additionally, instead of (VDD−VTH), the high voltage node is precharged by the power potential VDD, thereby reducing a setting time of the high voltage signal.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A high-voltage charge pump circuit for use in a semiconductor memory device, comprising:
   a precharge control means for precharging a first and a second nodes to a power potential in response to a first and a second clocks, respectively;
   a precharge means for precharging a third and a fourth nodes to the power potential in response to voltage levels of the first and second nodes, respectively;
   a first charge pumping means for bootstrapping the first and the second nodes to twice the power potential in response to the first and the second clocks, respectively;
   a second charge pumping means for bootstrapping the third and the fourth bootstrapping nodes to twice the power potential in response to a third and a fourth clocks; and
   a transfer means for transferring voltage level of the third and the fourth nodes to an exterior in response to voltage levels of the fourth and the third nodes, respectively.

2. The high-voltage charge pump circuit as recited in claim 1, wherein the first clock has the same phase as the fourth clock.

3. The high-voltage charge pump circuit as recited in claim 2, wherein the second clock has the same phase as the third clock.

4. The high-voltage charge pump circuit as recited in claim 3, wherein the precharge control means includes:
   a first PMOS transistor having a source coupled to the power potential and a gate coupled to a fifth node;
   a second PMOS transistor having a source coupled to a drain of the first PMOS transistor, a drain coupled to the fifth node and a gate receiving the first clock;
   a first NMOS transistor having a drain coupled to the drain of the second PMOS transistor, a source coupled to a ground potential and a gate receiving the first clock;
   a third PMOS transistor having a source coupled to the power potential and a gate coupled to a sixth node;
   a fourth PMOS transistor having a source coupled to a drain of the third PMOS transistor, a drain coupled to the sixth node and a gate receiving the second clock; and
   a second NMOS transistor having a drain coupled to the drain of the fourth PMOS transistor, a source coupled to the ground potential and a gate receiving the second clock.

5. The high-voltage charge pump circuit as recited in claim 3, wherein the precharge means includes:
   a first NMOS transistor, coupled between the power potential and the third node, whose gate receives a voltage level of the first node; and
   a second NMOS transistor, coupled between the power potential and the fourth node, whose gate receives a voltage level of the second node.

6. The high-voltage charge pump circuit as recited in claim 3, wherein the first charge pumping means includes:
   a first NMOS transistor having a drain and a source receiving the first clock and a gate coupled to the first node; and
   a second NMOS transistor having a drain and a source receiving the second clock and a gate coupled to the second node.

7. The high-voltage charge pump circuit as recited in claim 3, wherein the second charge pumping means includes:
   a first NMOS transistor having a drain and a source receiving the third clock and a gate coupled to the third node; and
   a second NMOS transistor having a drain and a source receiving the fourth clock and a gate coupled to the fourth node.

8. The high-voltage charge pump circuit as recited in claim 3, wherein the transfer means includes:
   a first PMOS transistor, coupled between the third node and a high voltage node, whose gate receives a voltage level of the fourth node; and
   a second PMOS transistor, coupled between the fourth node and the high voltage node, whose gate receives a voltage level of the third node.

9. A high voltage generator for providing a high voltage signal for use in a semiconductor memory device, comprising:

a level detection means for detecting a voltage level of the high voltage signal to generate a high voltage enable signal when the voltage level of the high voltage signal reaches a predetermined target value;

an oscillation means, in response to the high voltage enable signal, for generating a plurality of clocks, the clocks including a first to a fourth clocks;

a high-voltage charge pump means, in response to the clocks, for increasing a voltage level of an external power signal to generate the high voltage signal to a high voltage node; and a power-on precharging means, in response to a control signal, for initializing the high voltage node to a predetermined level.

10. The high voltage generator as recited in claim 9, wherein the control signal is a power-on signal activated when a power applied to the high voltage generator is on.

11. The high voltage generator as recited in claim 10, wherein the power-on precharging means includes:

a first PMOS transistor having a source coupled to the high voltage node and a gate receiving the power-on signal;

an NMOS transistor having a drain coupled to a drain of the first PMOS transistor, a source coupled to a ground potential and a gate receiving the power-on signal; and a second PMOS transistor coupled between a power potential and the high voltage node, whose gate is coupled to the drain of the NMOS transistor.

12. The high voltage generator as recited in claim 9, wherein the high-voltage charge pump means includes:

a precharge control means for precharging a first and a second nodes to a power potential in response to the first and the second clocks, respectively;

a precharge means for precharging a third and a fourth nodes to the power potential in response to voltage levels of the first and second nodes, respectively;

a first charge pumping means for bootstrapping the first and the second nodes to twice the power potential in response to the first and the second clocks, respectively;

a second charge pumping means for bootstrapping the third and the fourth bootstrapping nodes to twice the power potential in response to the third and the fourth clocks; and a transfer means for transferring voltage level of the third and the fourth nodes to an exterior in response to voltage levels of the fourth and the third nodes, respectively.

13. The high voltage generator as recited in claim 12, wherein the first clock has the same phase as the fourth clock.

14. The high voltage generator as recited in claim 13, wherein the second clock has the same phase as the third clock.

15. The high voltage generator as recited in claim 14, wherein the precharge control means includes:

a first PMOS transistor having a source coupled to the power potential and a gate coupled to a fifth node;

a second PMOS transistor having a source coupled to a drain of the first PMOS transistor, a drain coupled to the fifth node and a gate receiving the first clock;

a first NMOS transistor having a drain coupled to the drain of the second PMOS transistor, a source coupled to a ground potential and a gate receiving the first clock;

a third PMOS transistor having a source coupled to the power potential and a gate coupled to a sixth node;

a fourth PMOS transistor having a source coupled to a drain of the third PMOS transistor, a drain coupled to the sixth node and a gate receiving the second clock; and a second NMOS transistor having a drain coupled to the drain of the fourth PMOS transistor, a source coupled to the ground potential and a gate receiving the second clock.

16. The high voltage generator as recited in claim 14, wherein the precharge means includes:

a first NMOS transistor, coupled between the power potential and the third node, whose gate receives a voltage level of the first node; and a second NMOS transistor, coupled between the power potential and the fourth node, whose gate receives a voltage level of the second node.

17. The high voltage generator as recited in claim 14, wherein the first charge pumping means includes:

a first NMOS transistor having a drain and a source receiving the first clock and a gate coupled to the first node; and a second NMOS transistor having a drain and a source receiving the second clock and a gate coupled to the second node.

18. The high voltage generator as recited in claim 14, wherein the second charge pumping means includes:

a first NMOS transistor having a drain and a source receiving the third clock and a gate coupled to the third node; and a second NMOS transistor having a drain and a source receiving the fourth clock and a gate coupled to the fourth node.

19. The high voltage generator as recited in claim 14, wherein the transfer means includes:

a first PMOS transistor, coupled between the third node and a high voltage node, whose gate receives a voltage level of the fourth node; and a second PMOS transistor, coupled between the fourth node and the high voltage node, whose gate receives a voltage level of the third node.

* * * * *